US 9,520,799 B2

United States Patent
Weaver, Jr. et al.

(10) Patent No.: US 9,520,799 B2
(45) Date of Patent: Dec. 13, 2016

(54) POWER DEVICE

(75) Inventors: W. J. "Jim" Weaver, Jr., Tulsa, OK (US); Michael H. Freeman, Tulsa, OK (US); Mitchael C. Freeman, Sapulpa, OK (US); Robert Dieter, Owasso, OK (US); Brian Santee, Tulsa, OK (US)

(73) Assignee: ADVANCED CHARGING TECHNOLOGIES, LLC, Tulsa, OK (US)

( * ) Notice: Subject to any disclaimer, the term of this patent is extended or adjusted under 35 U.S.C. 154(b) by 392 days.

(21) Appl. No.: 13/588,262

(22) Filed: Aug. 17, 2012

(65) Prior Publication Data

US 2014/0049176 A1 Feb. 20, 2014

(51) Int. Cl.
*H02M 5/458* (2006.01)
*H02M 7/217* (2006.01)
(Continued)

(52) U.S. Cl.
CPC .............. *H02M 5/458* (2013.01); *H02M 1/36* (2013.01); *H02M 3/33507* (2013.01);
(Continued)

(58) Field of Classification Search
CPC .. H02M 3/33507; H02M 7/48; H02M 3/3353; H02M 7/217; H02M 2001/0019; H02M 5/458; H02J 3/00; H02J 4/00; H05B 37/00
(Continued)

(56) References Cited

U.S. PATENT DOCUMENTS 4,997,381 A 3/1991 Oh
5,159,545 A 10/1992 Lee
(Continued)

FOREIGN PATENT DOCUMENTS

CA 2 431 689 A1 12/2004
EP 0 398 722 A2 11/1990
(Continued)

OTHER PUBLICATIONS

An introduction to LLC resonant half-bridge converter, ST Microelectronics, Sep. 2008, p. 1-64, retrieved from the Internet on Dec. 10, 2012 at http://www.resonant-converters.eu/st-an2644.pdf.
(Continued)

*Primary Examiner* — Gustavo Rosario Benitez
(74) *Attorney, Agent, or Firm* — Howard & Howard Attorneys PLLC (57) ABSTRACT

An energy efficient apparatus includes a switching device, a frequency dependent reactive device, and a control element is provided. The switching device is coupled to a source of electrical power and includes a pair of transistors and is adapted to receive a control signal and to produce an alternating current power signal. The frequency of the alternating current power signal is responsive to the control signal. The frequency dependent reactive device is electrically coupled to the pair of transistors for receiving the alternating current power signal and producing an output power signal. The frequency dependent reactive device is chosen to achieve a desired voltage of the output power signal relative to the frequency of the alternating current power signal. The control element senses an actual voltage of the direct current power signal and modifies the control signal delivered to achieve the desired voltage of the direct current power signal.

43 Claims, 7 Drawing Sheets

(51) Int. Cl.
  *H02M 7/155* (2006.01)
  *H02M 3/335* (2006.01)
  *H02M 7/48* (2007.01)
  *H02M 1/36* (2007.01)
  *H02M 1/00* (2006.01)

(52) U.S. Cl.
  CPC .......... *H02M 7/155* (2013.01); *H02M 7/217* (2013.01); *H02M 7/2176* (2013.01); *H02M 7/48* (2013.01); *H02M 2001/0009* (2013.01); *H02M 2001/0019* (2013.01); *Y10T 307/406* (2015.04)

(58) Field of Classification Search
  USPC ................. 363/21.02, 21.03, 34, 37, 24, 26; 323/266–268
  See application file for complete search history.

(56) References Cited

U.S. PATENT DOCUMENTS

| | | | |
|---|---|---|---|
| 5,641,311 | A | 6/1997 | Chuang |
| 6,094,017 | A * | 7/2000 | Adamson ................ 315/291 |
| 6,134,125 | A | 10/2000 | Wenzel |
| 6,486,618 | B1 | 11/2002 | Li |
| 6,611,129 | B2 | 8/2003 | Bucur |
| 7,960,648 | B2 | 6/2011 | McGinley et al. |
| 2002/0113556 | A1 | 8/2002 | Tao et al. |
| 2003/0048096 | A1 | 3/2003 | Liu et al. |
| 2005/0105305 | A1* | 5/2005 | Sawada et al. ............ 363/34 |
| 2005/0162870 | A1 | 7/2005 | Hirst |
| 2005/0213267 | A1 | 9/2005 | Azrai et al. |
| 2008/0198634 | A1* | 8/2008 | Scheel et al. ............. 363/21.02 |
| 2009/0033293 | A1* | 2/2009 | Xing et al. ................ 320/164 |
| 2009/0034299 | A1 | 2/2009 | Lev |
| 2009/0316443 | A1* | 12/2009 | Coccia et al. ............ 363/21.06 |
| 2011/0210833 | A1 | 9/2011 | McNeely et al. |
| 2011/0278923 | A1 | 11/2011 | Pance et al. |
| 2011/0299309 | A1* | 12/2011 | Chen ........................ 363/37 |
| 2012/0277931 | A1 | 11/2012 | Chao et al. |

FOREIGN PATENT DOCUMENTS

| | | |
|---|---|---|
| EP | 2 306 626 A1 | 4/2011 |
| GB | 2 410 384 A | 7/2005 |
| JP | 03235657 A2 | 10/1991 |
| JP | 09047018 A2 | 2/1997 |
| JP | H0992340 A | 4/1997 |
| JP | 10215564 A2 | 8/1998 |
| JP | 2001177914 A2 | 6/2001 |
| JP | 2001197726 A2 | 7/2001 |
| JP | 2002-521792 A | 7/2002 |
| JP | 2011072094 A2 | 4/2011 |
| KR | 10-2009-0107519 | 10/2009 |
| WO | 2008/082578 A1 | 7/2008 |

OTHER PUBLICATIONS

Patent Examination Report No. 1 (date of issue Oct. 12, 2012).
International Search Report; Issue date: Sep. 16, 2014; PCT.
Patent Examination Report No. 3—Date of Issue Oct. 22, 2013.
International Search Report and Written Opinion (PCT/US2013/055402)—Date of Mailing Mar. 25, 2014.
Patent Examination Report No. 2—Date of Issue Sep. 23, 2013.
Patent Examination Report No. 1 (AU 2014202758); Date of Issue: May 19, 2015.
Notice of Reasons for Rejection with English Translation (JP App. No. P2015-527666; O/R 068466.00075); Dispatch Date: Mar. 29, 2016.
Korean Notification of Reason for Refusal with English Translation (KR 10-2015-7006724; O/R 068466.00076); Date: Apr. 11, 2016.
Ma, Mengzhe, Design of High Efficiency Step-Down Switched Capacitor DC/DC Converter, May 21, 2003, 71 pages, Oregon State University.
Chen et al., Low-Power Circuits for the Bidirectional Wireless Monitoring System of the Orthopedic Implants, IEEE Transactions of Biomedical Circuits and Systems, Dec. 2009, pp. 437-443, vol. 3, No. 6, China.
Non-Final Office Action (U.S. Appl. No. 14/875,382; O/R 068466.00100); Notification Date: May 19, 2016.

* cited by examiner

POWER DEVICE

CROSS REFERENCE TO RELATED APPLICATION

This application claims priority to Australian Patent Application No. 2012216284, filed Aug. 17, 2012, the disclosure of which is hereby incorporated by reference in its entirety.

FIELD OF THE INVENTION

The present invention relates generally to power device circuits, and more particularly, to a power circuit which transforms electrical power utilizing a frequency dependent reactive device.

BACKGROUND OF THE INVENTION

The Energy Crises Requires Demand Side Response That Lowers Current Loads. The Energy Crisis is upon us worldwide. For instance, the U.S. Department of Energy predicts that by 2015 there will not, on the average, be enough electric power to supply average demand in the U.S.

One of the controllable offenders is "Vampire Loads". Also call "Wall Wort Power" or "Standby Power" this electricity waste makes up a large portion of homes' or offices' miscellaneous electric load and is a large waste of power. Vampire Load producers includes cell phone chargers, lap top chargers, notebook chargers, calculator chargers, small appliances, and other battery powered consumer devices.

The U.S. Department of Energy said in 2008:

"Many appliances continue to draw a small amount of power when they are switched off. These "phantom" loads occur in most appliances that use electricity, such as VCRs, televisions, stereos, computers, and kitchen appliances. This can be avoided by unplugging the appliance or using a power strip and using the switch on the power strip to cut all power to the appliance."

According to the U.S. Department of Energy, the following types of devices consume standby power:

1. Transformers for voltage conversion. (Including cell phone, lap top and notepad, calculators and other battery powered devices that use wall chargers).
2. Wall wart power supplies powering devices which are switched off. (Including cell phone, lap top and notepad, calculator, battery powered drills and tools, all of which have wall chargers and have either completely charged the batteries or are actually disconnected from the device).
3. Many devices with "instant-on" functions which respond immediately to user action without warm-up delay.
4. Electronic and electrical devices in standby mode which can be woken by a remote control, e.g. some air conditioners, audio-visual equipment such as a television receiver.
5. Electronic and electrical device which can carry out some functions even when switched off, e.g. with an electrically powered timer. Most modern computers consume standby power, allowing them to be woken remotely (by Wake on LAN, etc.) or at a specified time. These functions are always enabled even if not needed; power can be saved by disconnecting from mains (sometimes by a switch on the back), but only if functionality is not needed.
6. Uninterruptible power supplies (UPS)

All this means that even when a cell phone, lap top or like device is completely charged, current is still flowing, but not accomplishing anything and wasting electricity. Most recently manufactured devices and appliances continue to draw current all day, every day—and cost you money and add to the Energy Crisis Worldwide.

The National Institute of Standards and Technology (NIST) (a division of the U.S. Department of Commerce) through its Buildings Technology Research and Development Subcommittee in 2010 stated its goals for reducing "plug loads," stating:

"The impact of plug loads on overall consumption is quite significant. For commercial buildings, plug loads are estimated at 35% of total energy use, for residential 25%, and for schools 10%.

Opportunities for lowering plug loads include:
1) more efficient plugged devices and appliances,
2) automated switching devices that turn off unused appliances and reduce "vampire" loads from transformers and other small but always on appliances, or
3) modifying occupant behaviors."

The present invention is aimed at one or more of the problems identified above to provide better efficiencies.

SUMMARY OF THE INVENTION

In one aspect of the present invention, an apparatus comprises a switching device and a frequency dependent reactive device. The switching device is coupled to a source of electrical (inrush) power and is adapted to receive a control signal and to produce an alternating current power signal. The frequency of the alternating current power signal is responsive to the control signal. The frequency dependent reactive device is electrically coupled to the switching device for receiving the alternating current power signal and producing an output power signal having a voltage level. The frequency dependent reactive device is chosen to achieve a desired voltage of the output power signal relative to the frequency of the alternating current power signal.

In another aspect of the invention, an apparatus including a switching device, a frequency dependent reactive device, and a control element is provided. The switching device is coupled to a source of electrical power and includes a first pair of transistors in a totem pole configuration. The switching device is adapted to receive a control signal and to produce an alternating current power signal. The frequency of the alternating current power signal being responsive to the control signal. The frequency dependent reactive device is electrically coupled to the first pair of transistors for receiving the alternating current power signal and producing an output power signal having a voltage level. The frequency dependent reactive device is chosen to achieve a desired voltage of the output power signal relative to the frequency of the alternating current power signal. The control element is coupled to the switching device and the frequency dependent reactive device for sensing an actual voltage of the direct current output power signal and responsively modifying the control signal delivered to fine tune the switching device to achieve the desired voltage of the direct current output power signal.

In another aspect of the present invention, a power circuit for providing electrical power at a desired voltage level from an alternating current power source is provided. The power circuit includes a rectifying circuit, a switching device, a control element, and a frequency dependent reactive device. The rectifying circuit is electrically coupled to the alternative current power source for producing a rectified AC power signal. The switching device is coupled to the rectifying circuit and includes first and second pairs of transistors. Each pair of transistors is arranged in a totem pole configuration fixed at 180 degrees of each other. The first and second pairs of transistors drive a high-side output and a low-side output, respectively, to produce an alternating current power signal. The frequency of the alternating current power signal is responsive to a control signal. The control element is coupled to the switching device for delivering the control signal to the switching device. The frequency dependent reactive device is electrically coupled to the first and second pairs of transistors for receiving the alternating current power signal and producing an output power signal. The frequency dependent reactive device includes first and second reactive elements and a rectifier. The first and second reactive elements are electrically coupled to the high-side and low-side outputs, respectively, and to the rectifier, and are chosen to achieve the desired voltage of the output power signal relative to the frequency of the alternating current power signal. The control element is configured to modify the control signal delivered to the switching element to fine tune the switching device to achieve the desired voltage of the output power signal.

This invention works for both battery powered devices and direct powered devices. With a communication chip included in the SmartProng™ Technology Plug/cord, powered appliances can receive a command to shut-off the appliance/device at certain times (usually designated as "Demand Response" times by the Electrical Utility) and thus cover the entire plug load market with added energy efficiency.

Many similar existing electronic devices use a "Post-Regulation System" which extracts the exact power flow from a wall outlet then modifies it to an approximately desired AC voltage, usually through the use of a transformer, which is then converted to pulsating DC through the use of a rectifying system (usually in a circuit board), commonly through the use of a full wave bridge. Then an electrolytic capacitor is used to provide an unregulated DC voltage. Finally, a linear regulator device is used to provide the desired regulated DC power. Because the regulator is at the end of this chain, this is described herein a as a "Post-Regulation System." All of the parts in the chain provide losses which come in the form of heat and waste of electricity (loss). In the Post-Regulation Systems, the largest loss typically comes from the linear regulator followed closely by the transformer.

This invention is a method for a design and utility patent for "Pre-Regulating" power current loads for devices which makes transformers obsolete, and regulating battery fulfillment, turning-off power when the battery is full and saving wasted energy.

One way to replace the transformer in such a system is through capacitor drop technology which is described herein. This process hinges on a capacitor's ability to pass an AC voltage that diminishes with frequency. For a given frequency, such as 60 cycle AC, it is possible to select a value that will deliver a desired AC output for a given load. This characteristic is similar to a valve in a water pipe. Because of this mode of action, this process is almost lossless.

In the current invention, the capacitors are used on the circuit board instead of a transformer.

The present invention utilizes capacitor drop technology, by housing it in or connected directly to the plug prong or prongs, which are then plugged into and AC outlet, makes the prongs themselves one or more capacitors. One advantage is that the voltage leaving the outlet socket is limited right from the start. This conserves energy and makes the SmartProng Plug safer. Thus safety and efficiency are embodied in a new and unique way into the same product. The miniature capacitors which are either embedded into one or more prongs or are connected to one or more prongs and housed in the plug can have a fixed value, like a plug that only delivers 5 volts AC at 1 Amp which would be the 5 watts needed to charge a cell phone. Or a fixed value could deliver 10 volts AC at 2 Amps for the 12 watts needed to power an iPad or similar notebook. Alternatively, the capacitance can be housed on the circuit board, replacing the need for the transformer and linear regulator combination.

In this configuration just the fixed capacitance could be utilized, or a chip, like Maxim's MAX8971 could be integrated with the SmartProng circuitry to create intelligence that would sense when the battery is full and disconnect the prong(s) capacitor from the AC outlet, thus shutting off the Vampire Load.

The current invention uses an embedded processor which controls the process. This processor could also contain or be coupled with a carrier current system (communication over power lines) or wireless communication chip which would enable remote operation by the powered device or other remote system.

The invention modifies and controls the capacitance of a capacitor drop system, and eliminates the need for the transformer linear regulator combination at the end of the chain. Instead, it controls the amount of current (amps×volts) that exits by frequency modulation.

As such, the capacitor charging technology is a very efficient because the two most heat producing and wasteful portions of the chain, i.e. the transformer and the linear regulators, are eliminated altogether. Moreover, many external charging devices provide less (700-800 mA) than the 1 A needed to adequately charge a phone, much less the 2.4 A needed to charge and run (while charging) devices like a tablet (i.e. a Samsung Galaxy or an iPad) or the 9.2 A needed to charge and/or run a notebook or laptop. The current invention can alter the voltage and amp outputs to be able to either charge one or more cell phones, or one or more tablets, or one or more notebooks/laptops, or alternatively one or more cell phones and one or more tablet, notebooks, and or laptops. All charging combinations of cell phones, tablets, notebooks, and/or laptops are possible. The current invention's software and microprocessor recognizes through its logic in the microprocessor the draw from the battery as connected and analyzes the ramp up draw from that battery and then either sends 1 A (for charging a cell phone) or up to 2.4 A for devices like a tablet; or up to 9.2 A for charging a notebook or laptop, which the current invention can either do alternatively or at the same time. In one embodiment, the acceptable input voltage can range from a low of 85V—a high of 300V worldwide. Output voltage is device dependent but 5V to 19V are possible.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF INVENTION

Figure 1:
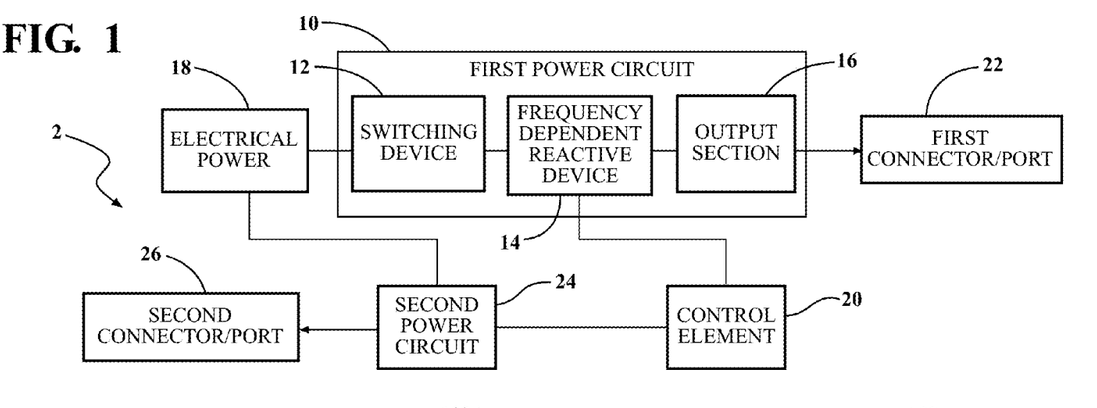
FIG. 1 is a block diagram of a power circuit for use, for example, in a power supply, according to an embodiment of the present invention.

Referring to the Figures, wherein like numerals indicate like or corresponding parts throughout the several views, a power device 2 having a first power circuit 10 is provided. As shown in FIG. 1, the first power circuit 10 includes a switching device 12, a frequency dependent reactive device 14 and an output section 16.

The first power circuit 10 may be used to convert the power provided by a source of electrical power of a first type to electrical power of a more desirable type. For example, the first power circuit 10 may be used to convert electrical power received from a source of electrical power 18, such as a power grid. The source of electrical power 18 may be provided as an alternating current at a given voltage, e.g., 120 volts at a frequency of 60 Hertz (the North American Standard) or 220-240 volts at a frequency of 50 Hz (the European Standard) to a more desirable voltage. The acceptable input voltage range for the invention is a low of 85 volts to a high of 300 volts at either 50 or 60 Hertz so as to accept a world-wide range of mains power. The output electrical power, at the desired voltage, may be supplied at a direct current, such as 5 volts direct current (VDC) or an AC signal of any desirable waveform.

In one aspect, the first power circuit 10 of the present invention provides a power supply circuit which replaces the transformer of prior art power supplies with the in-line frequency dependent reactive device 14. As discussed more fully below, the frequency dependent reactive device 14, in general, passes an alternating current whose voltage level changes with frequency. In other words the frequency dependent reactive device 14 passes current at varying efficiency which is dependent on frequency. By proper value selection the capacitor can allow a lossless voltage drop. Therefore, the power circuit 10 avoids the inefficiencies of the standard power supply circuit which includes a transformer. The inefficiencies of the prior art transformer based circuits are typically exhibited, at least in part, as excess generated heat.

Returning to FIG. 1, the switching device 12 is coupled to the source of electrical power 18. The switching device 12 is adapted to receive a control signal and to produce an alternating current power signal. The frequency of the alternating current power signal is responsive to the control signal.

As explained more fully below, the control signal is generated by a control element 20 (which may be microprocessor based). In one embodiment, the control signal is a variable frequency. The frequency of the control signal is modified to deliver the desired output power.

The frequency dependent reactive device 14 is electrically coupled to the switching device 12 and receives the alternating current power signal and produces an alternating current output power signal having a reduced voltage level. The frequency dependent reactive device is chosen to achieve a desired voltage of the output power signal relative to the alternating current power delivered by switching device 12.

Returning to FIG. 1, the first power circuit 10 may provide electrical power from the output section 16 through an appropriate power connector or port 22, such as a universal serial bus (USB) port. In the illustrated embodiment, the power device 2 includes a second power circuit 24, which is electrically coupled to the control element 20, and provides output power through a second power connector or port 26. In one embodiment, the second power circuit 24 is similar or identical to the first power circuit 10.

Figure 2:
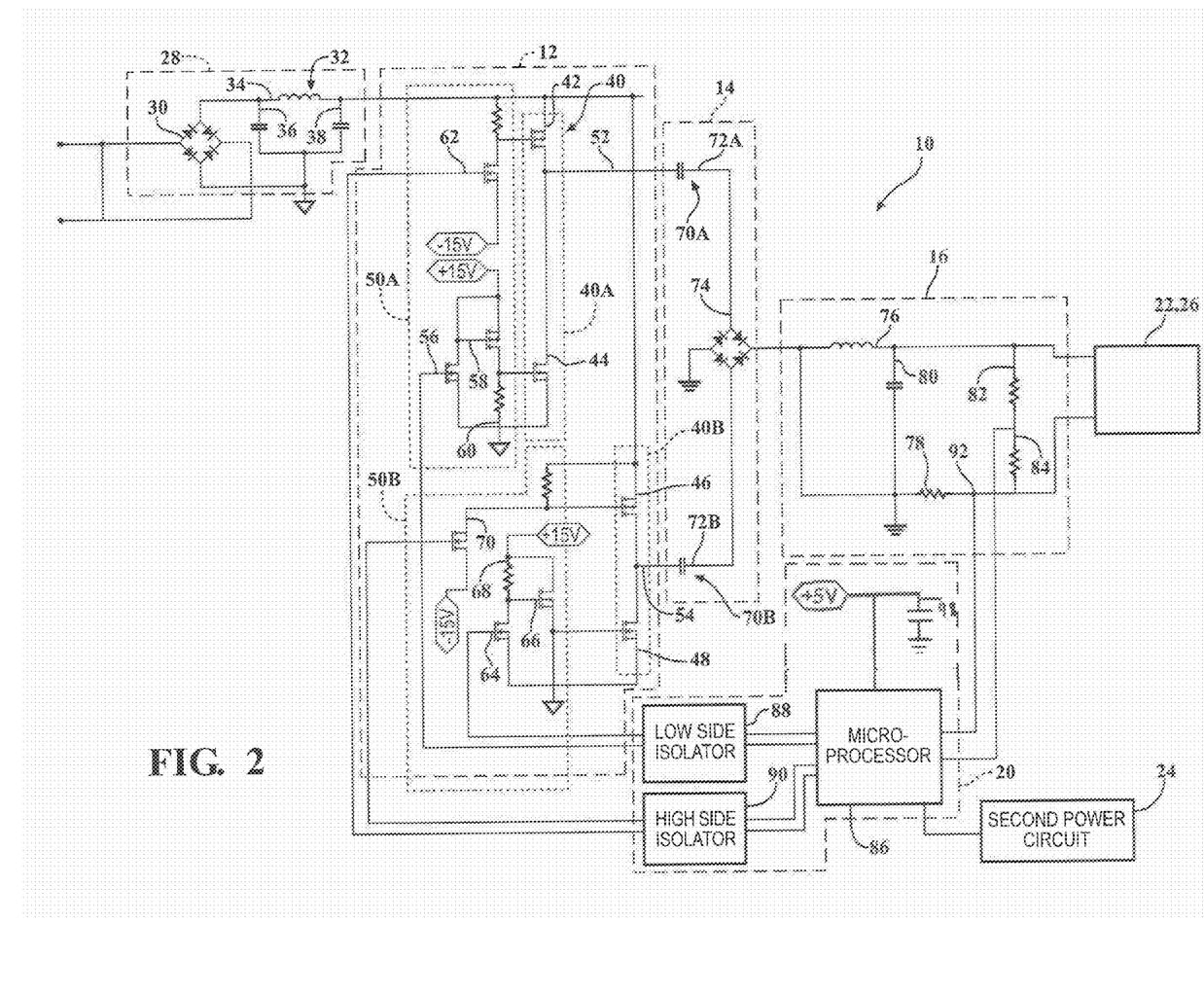
FIG. 2 is a schematic of the power circuit of FIG. 1, according to an embodiment of the present invention.
Figure 3:
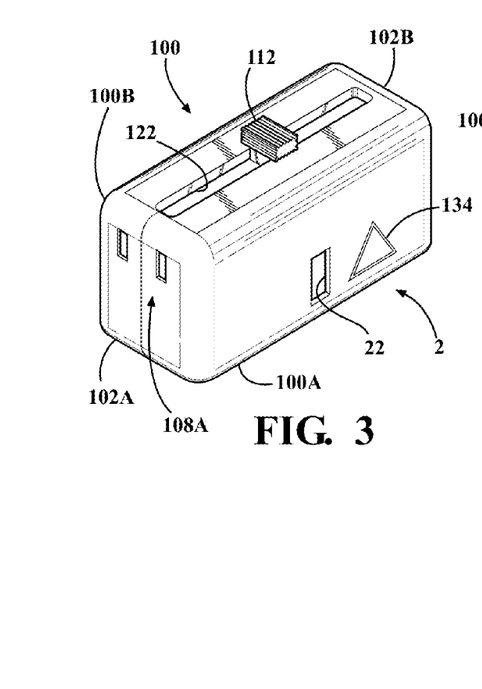
FIG. 3 is an isometric drawing of a first view of a power circuit having a housing, according to an embodiment of the present invention.
Figure 4:
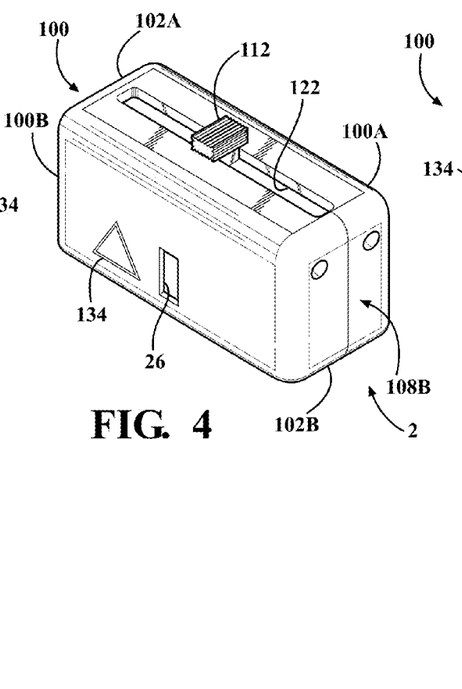
FIG. 4 is an isometric drawing of a second view of the housing of FIG. 3.
Figure 5:
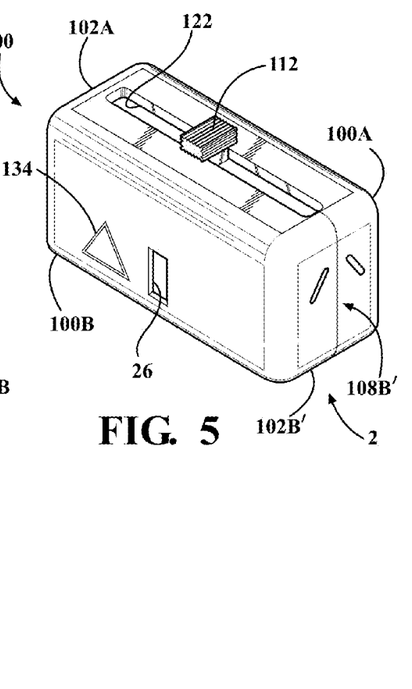
FIG. 5 is an isometric drawing of an alternative power circuit housing.

A first embodiment of the first power circuit 10 is shown in FIG. 2. The first power circuit 10 includes an input or rectifying circuit 28. The input circuit 28 is electrically coupled to the source of electrical power 18. The input circuit 28 converts the input electrical power to a DC voltage at a voltage dependent upon the input power. For example, in one embodiment the input power is 120 volts at 60 Hz, and the input circuit 28 converts the input power to approximately 180 volts (DC).

In the illustrated embodiment, the input circuit 28 includes a first full-wave bridge rectifier 30 having first and second input terminals coupled to the high and low sides of the source of electrical power 18. The output terminals of the first full-wave bridge rectifier 30 are coupled to a circuit which includes an inductor 32. The ends of the inductor 32 are electrically coupled to ground through first and second capacitors 36, 38, respectively. The full-wave rectified output of the full-wave bridge rectifier 30 is converted into a DC voltage signal at, e.g., approximately 180 volts by this circuit.

The switching device 12 receives a control signal from the control element 20 and converts the DC voltage output of the input circuit 28 into an alternating current power signal. The frequency of the alternating current power signal is responsive to the control signal.

In one embodiment, the switching device includes a first pair of transistors 40A and a second pair of transistors 40B, both pairs 40A, 40B are arranged in a totem pole arrangement.

In the illustrated embodiment, the first pair of transistors 40A includes a first P-channel MOSFET transistor 42 and a first N-channel MOSFET transistor 44. The second pair of transistors 40B includes a second P-channel MOSFET transistor 46 and a second N-channel MOSFET transistor 48.

Each pair of transistors 40A, 40B is driven by first and second driver circuits 50A, 50B. The driver circuits 50A, 50B are electrically coupled to the control element 20. The driver circuits 50A, 50B receive the control signal and deliver a driver signal to the respective pair of transistors, 40A, 40B.

The first pair of transistors 40A drive the highside 52 of the output of the switching circuit 12 and the second pair of transistors 40B drive the lowside 54 of the output of the switching circuit 12. The output of the first and second pairs of transistors 40A, 40B are 180 degrees out of phase with respect to each other. In other words, when the highside 52 of the output of the switching circuit is high, the lowside 54 of the output of the switching circuit is low. And when the highside 52 of the output switching circuit is low, the lowside 54 of the output of the switching circuit 12 is high.

In the illustrated embodiment, the first driver circuit 50A includes a third N-channel MOSFET transistor 56 coupled to the control element 20, a third P-channel MOSFET transistor 58 coupled to the third N-channel MOSFET transistor 56 and a resistor 60 coupled between the third P-channel MOSFET transistor 58 and ground. The first driver circuit 50A also includes a fourth N-channel MOSFET transistor 62 coupled between the control element 20 and the first P-channel MOSFET transistor 42.

In the illustrated embodiment, the second driver circuit 50B includes a fifth N-channel MOSFET transistor 64 coupled to the control element 20, a fourth P-channel MOSFET transistor 66 coupled to the fifth N-channel MOSFET transistor 64 and a resistor 68 coupled between the fourth P-channel MOSFET transistor 66 and a positive rail voltage, e.g., +15 volts. The second driver circuit 50B also includes a sixth N-channel MOSFET transistor 68 coupled between the control element 20 and the second P-channel MOSFET transistor 46.

In the illustrated embodiment, each pair of transistors 40A, 40B consist of a P-channel MOSFET 42, 46 in a highside configuration over a N-channel MOSFET 44, 48 in a totem pole configuration. In this embodiment, the square wave outputs of the driver circuits 50A, 50B are in phase, but offset as to the DC level.

In an alternative embodiment, the first and second driver circuits 50A, 50B (and isolators 88, 90) may be replaced by integrated circuit (IC) drivers. Additionally, each pair of transistors 40A, 40B may be replaced by a pair of N-channel transistors in a totem pole configuration. In this arrangement, the square wave outputs of the IC drivers are 180 degrees out of phase.

The frequency dependent reactive device 14 includes at least one pair of reactive element like 70A, 70B in the illustrated embodiment. Since both the highside 52 and the lowside 54 are driven, the frequency dependent reactive device 14 includes first and second reactive elements 70A, 70B. In the illustrated embodiment, the first and second reactive elements 70A, 70B are capacitors 72A, 72B. The capacitors 72A, 72B may be nano-capacitors, and may be based upon ferroelectric and core-shell materials as well as those based on nanowires, nanopillars, nanotubes, and nanoporous materials.

In practice, the frequency of the control signal from the control element 20 controls the frequency of the alternating current power signal. For example, generally the switching circuit 14 creates an alternating current having a peak voltage based on the output voltage of the input circuit 28 and having a frequency based on the control signal. Since the value of the capacitors 72A, 72B are chosen based on the frequency of the alternating current power signal, the amount of power utilized from the source of electrical power 18, and thus, the efficiency of the power circuit 10, 24 can be controlled.

In one embodiment, the output power signal is a DC voltage at a target voltage, e.g., 5 volts. As shown in FIG. 2, the frequency dependent reactive device 14 may also include a second full-wave rectifier 74 to transform the alternating current signal from the capacitors 72A, 72B into a DC voltage.

The output subsection 16 of the power circuit 10 includes filters, and conditions the output of the switching circuit 14. The output section 16 includes an inductor 76 and a capacitor 80.

The output section 16 also includes a voltage divider, comprised of resistors 82, 84. The output of the voltage divider is fed to the control element 20 (see below).

In the illustrated embodiment, the control element 20 includes a microprocessor 86 and a lowside isolator 88 and a highside isolator 90.

The two highside isolator outputs are 180 degrees out of phase with each other. The two lowside isolator outputs are also 180 degrees out of phase with each other. The isolators 88, 90 disassociate the devices being charged from the source of electrical power 18. The purpose of this isolation is to eliminate shock hazards to the user.

Using the voltage divider circuit 82, 84, the control element 20, i.e., the microprocessor 86 can sense the actual voltage delivered (which can vary based on, e.g., manufacturing tolerances in the circuit components). The voltage output of the voltage divider circuit 82, 84 is input to an A/D input of the microprocessor 86. The control element 20 can also sense the current being delivered through sense resistor 78. Based on the sensed voltage and current delivered, the control element 20 can modify the frequency of the control signal to fine tune and more accurately control the output of the power circuit 10.

In one aspect of the present invention, the microprocessor 86 or control element 20 monitors the output power signal (through the voltage divider circuit 82, 84) and adjusts the control signals to the switching device 12 and the frequency dependent reactive device 14 to keep the power output within specification. The control element 20 includes the microprocessor 86 and an associated control program. The output of the voltage divider circuit 82, 84 is used to calculate/modify the frequency of the output signal(s), i.e., the frequency is increased if more voltage is required and lower if less voltage is required.

The control program may compensate for different output load conditions, component tolerances, component parameter variations at different operating points, and component changes due to temperature. The control program also monitors several operating parameters to turn the switching device off, which removes power from the output, if a condition that is unsafe or out of the operating range is detected.

In general, the control loop monitors the output power signal and adjusts the frequency of the switching device to make the output power signal stay within its operating limits. The control loop uses the nominal characteristics of the frequency dependent reactive element 14 for control decisions. For example, if the output power signal is below the operating limit, the frequency is changed to deliver more power to the output. The control loop performs other tasks like: a slow startup sequence to keep from overpowering an attached load, and fault monitoring and handling.

In one aspect of the present invention, the impedance of capacitors 72A, 72B can be represented as ideal capacitors defined as:

$$Z = \frac{1}{2\pi f C},$$

Where f represents the frequency of the control signal in Hertz and C is the value of the capacitor in Farads. Since the value of the impedance is inversely proportional to the frequency used, a capacitor value is selected that will produce the lowest required impedance at the highest desirable signal frequency. In the present invention, the lowest possible impedance is desired with the lowest possible input voltage ($V_i$), highest current load ($I_{max}$), and maximum acceptable switching frequency ($f_{max}$).

The purpose of the capacitors 72A, 72B are to supply the secondary with an attenuated voltage source with which the secondary side will further regulate to the desired output. The signal applied to the capacitor, Vi, minus the desired voltage on the secondary side $V_s$ is equal to the voltage attenuation of the capacitors 72A, 72B. The current through each capacitor 72A, 72B is equal to the current demanded by the load on the secondary. The desired Z of the capacitor is found using the following equation:

$$Z = \frac{(V_i - V_s)}{I_{max}}.$$

The proper value of the capacitor can be calculated using the ideal capacitor equation using Z and $f_{max}$.

The capacitor value gives the total attenuation capacitance needed. If full isolation is required, then two capacitors are used to isolate both sides of the AC signal. These two capacitors will be in a series connection, and capacitors in series add in this relationship:

$$C = \left(\frac{1}{C_a} + \frac{1}{C_b} \ldots \frac{1}{C_n}\right)^{-1}$$

For balancing of the circuit the two constituent capacitors $C_c$ are of equal value. Therefore, $$C = \left(\frac{1}{C_c} + \frac{1}{C_c}\right)^{-1} = \frac{C_c}{2}, \text{ and}$$

$$C_c = 2 * C.$$

The value of $C_c$ is the value of the actual components placed in the circuit.

With reference to FIGS. 4-16, in one embodiment of the present invention, the power device 2 is contained within a housing 100. In the illustrated embodiment, the housing 100 is comprised of a pair of half shells (first and second half-shells 100A, 100B) which form a cavity in which the power device 2 is located. The pair of half shells 100A, 100B may be held together by clips, an adhesive, or fasteners, any suitable fastening means, and the like, or combinations thereof. In the illustrated embodiment, the power device 2 includes two power circuits 10, 24 which provide power to the first and second ports 22, 26 which are shown as USB ports which are located on the first and second half-shells 100A, 100B, respectively. It should be noted that while in the illustrated embodiment, two USB ports are shown, it should be recognized that either more or less ports may be provided, and may be either based on a USB standard or other standards and connectors, like that used in notebooks and laptops.

The housing 100 has a first end 102A and a second end 102B. Each end 102A, 102B may controllably form an electrical plug 104A, 104B. The electrical plugs 104A, 104B may conform to different international standards. For example, in FIG. 10, the first electrical plug 104A is a North American standard plug formed by the first end 102A and a first pair of prongs 106A and the second electrical plug 104B is a European standard plug formed by the second end 102B and a second pair of prongs 106B. With respect to FIG. 12, either plug may be configured to meet any other standard such as the Australian standard (formed by the alternative end 104B' and the alternative prongs 106C).

In practice, the device 2 has three modes: a storage mode, a first mode, and a second mode. In the storage mode, both sets of prongs 106A, 106B, 106C are contained within the housing 100 (as shown in FIG. 3-9).

Figures 6, 7, 8, 9, 10, 11, 12:
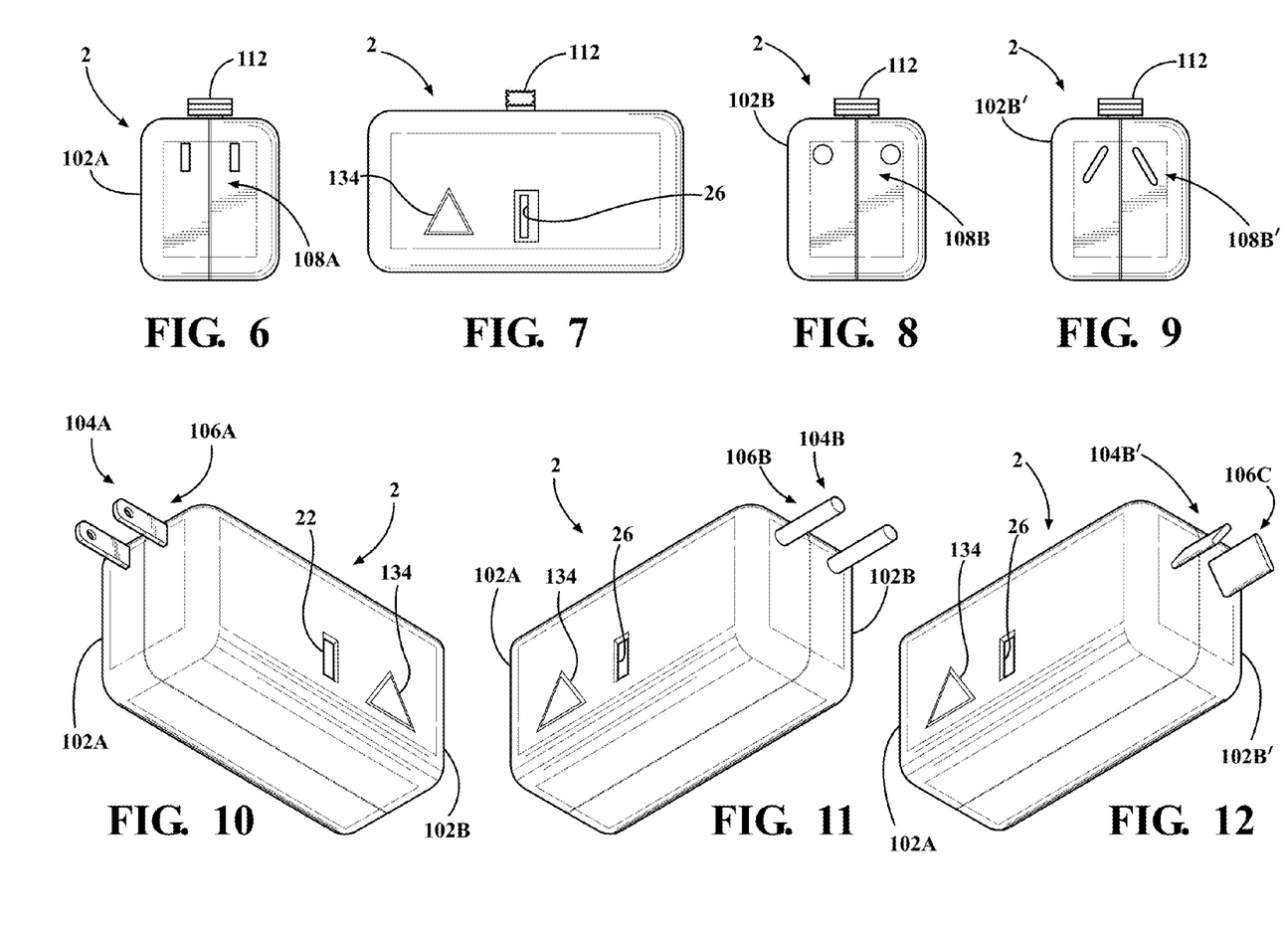
FIG. 6 is an isometric drawing of a side view of the housing of FIG. 3.
FIG. 7 is an isometric drawing of a second side view of the housing of FIG. 3.
FIG. 8 is an isometric drawing of an opposite side view of the housing of FIG. 3.
FIG. 9 is an isometric drawing of an opposite side view of the alternative power circuit housing.
FIG. 10 is another isometric drawing of the housing of FIG. 3.
FIG. 11 is a further isometric drawing of the housing of FIG. 3.
FIG. 12 is an isometric drawing of the alternative power circuit housing.

In the first mode, the prongs 106A comprising the first electrical plug 104A are extended through a first set of apertures 108A in the first end 102A (see FIG. 10)

In the second mode, the prongs 106B, 106C comprising the second electrical plug 104B, 104B' are extended though a second set of apertures 108B, 108B' in the second end 102B, 102B' (see FIGS. 11 and 12).

With respect to FIGS. 3-9, 13, and 15, the power device 2 includes actuation device 110. The actuation device 110 includes a button 112, a prong receiving apparatus 114, and a dust cover 116. The prong receiving apparatus 114 includes first and second slots which receive first and second double ended prong structures 118, 120. Each double ended prong structure 118, 120 forms one of the pairs of each set of prongs, as shown. The prong structures 118, 120 are electrically coupled to the first and second power circuits 10, 24.

Figure 13:
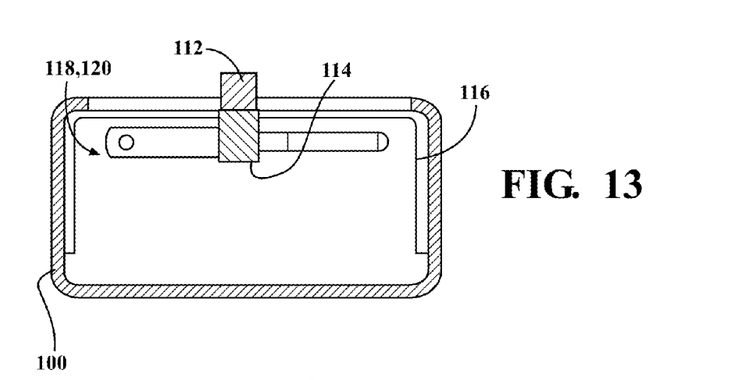
FIG. 13 is a cutaway drawing of the power circuit housing of FIG. 3.
Figure 15:
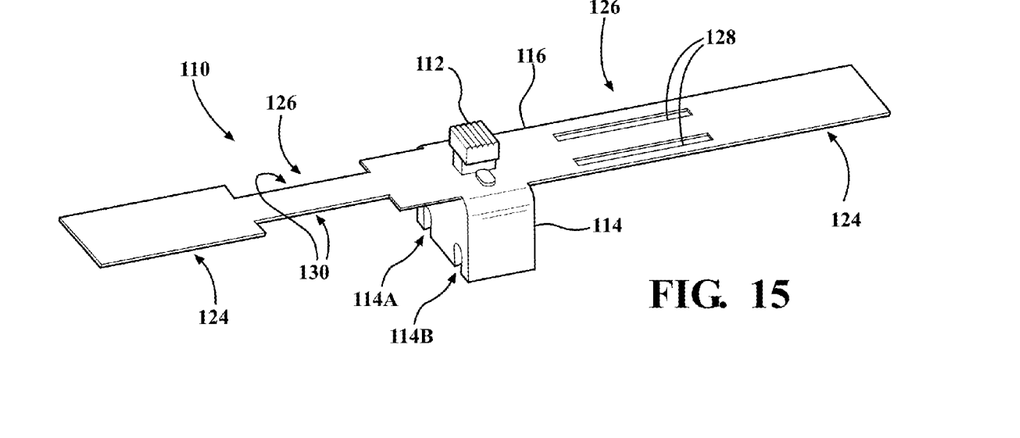
FIG. 15 is a drawing of a dust shield associated with the housing of FIG. 3, according to an embodiment of the present invention.
Figure 16:
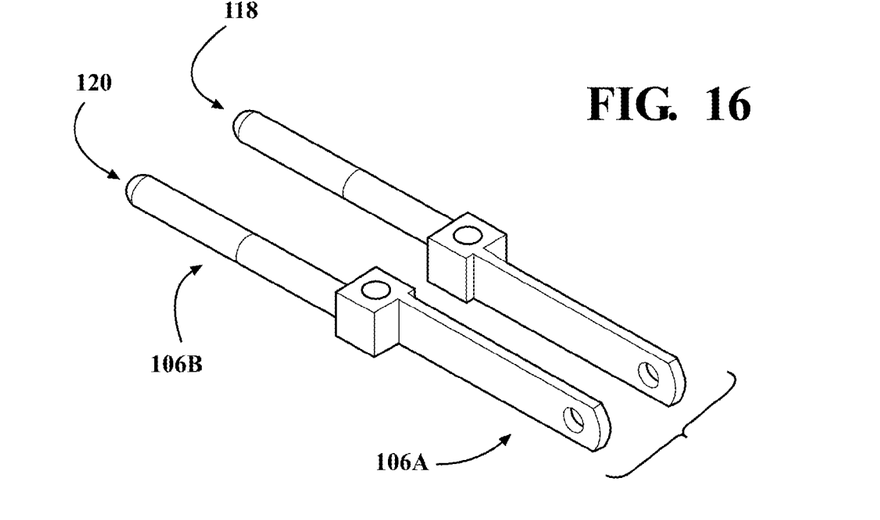
FIG. 16 is an illustration of a prong element for use with the dust shield of FIG. 15.

The button 112 is affixed or formed on an opposite side of the dust cover 116. The button 112 extends through, and is movable along, a slot 122 formed in the housing 100. Actuation of the button 112 in either direction along the slot 122 extends one of the pairs of prongs 106A, 106B, 106C through the respective apertures 108A, 108B, 108B'.

As shown in FIG. 13, the dust cover 114 wraps around the inner surface of the housing 100. The lower portions 124 of the dust cover 114 covers or blocks the apertures to prevent or minimize entry of dust and other contaminants into the housing 100. As the button 112 is manipulated towards one end of the slot 122, the respective prongs 106A, 106B, 106C are moved towards and extend through the apertures 108A, 108B, 108C. At the same time, the dust cover 110 is also moved. A respective upper portion 126 of the dust cover 110 is moved towards the respective apertures 108A, 108B, 108C such that a respective set of apertures 128, 130 in the dust cover are generally aligned with the apertures, thereby allowing the prongs 106A, 106C, 106C to pass therethrough.

Figure 14:
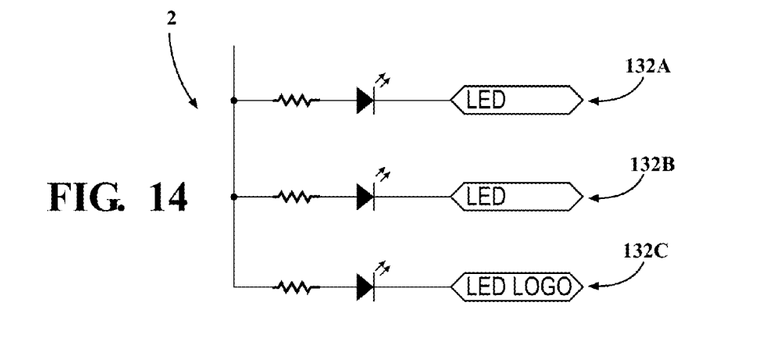
FIG. 14 is a schematic of a LED circuit, according to an embodiment of the present invention.

With reference to FIG. 14, in one embodiment the power circuits 10, 24 includes three separate LED circuits 132A, 132B, 132C (each comprising a resistor in series with a LED, as shown). The first and second LED circuits 132A, 132B are used to illuminate the first and second USB ports 22, 26, respectively. The third LED circuit 132C is located behind a logo 134 located on each side of the housing 100.

Lighting of the logos 134 using the third LED circuit 132C, in one embodiment, is used to power is being applied to the device being power or charged through one of the ports. Lighting of the ports may be used to confirm that the attached device (not shown) is being charged. A pulsing scheme may be implemented in order to communicate the current relevant state of charge. For example, the LED (for the respective USB port) may be rapidly pulsed when the device being charged is in a low state of charge with the pulse rate diminishing as the device approaches full charge.

Figure 17:
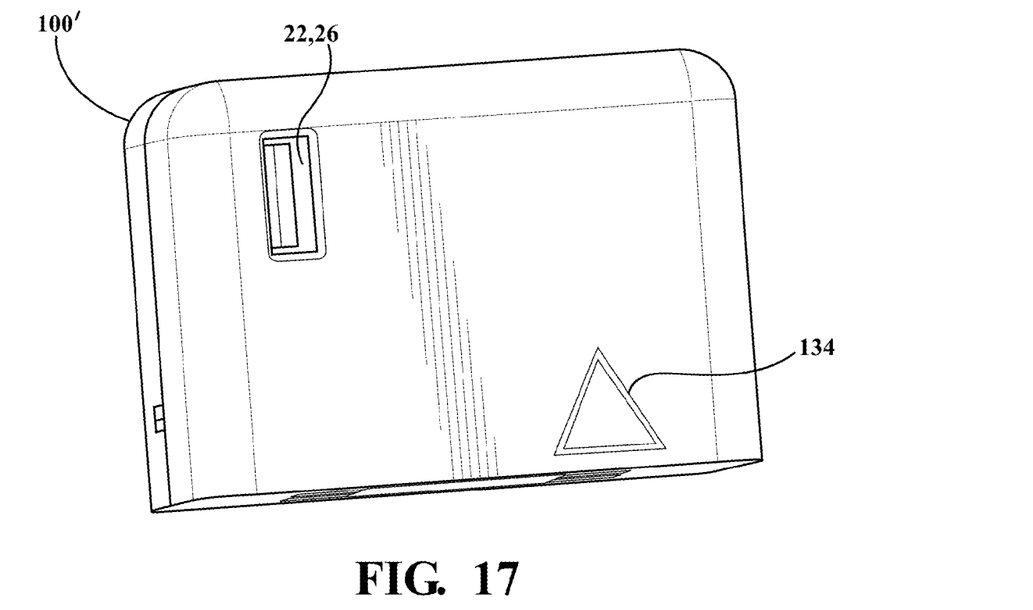
FIG. 17 is a first view of an alternative housing for use with the power circuit, according to an embodiment of the present invention; and, FIG. 18 is a second view of the alternative housing of FIG. 17.
Figure 18:
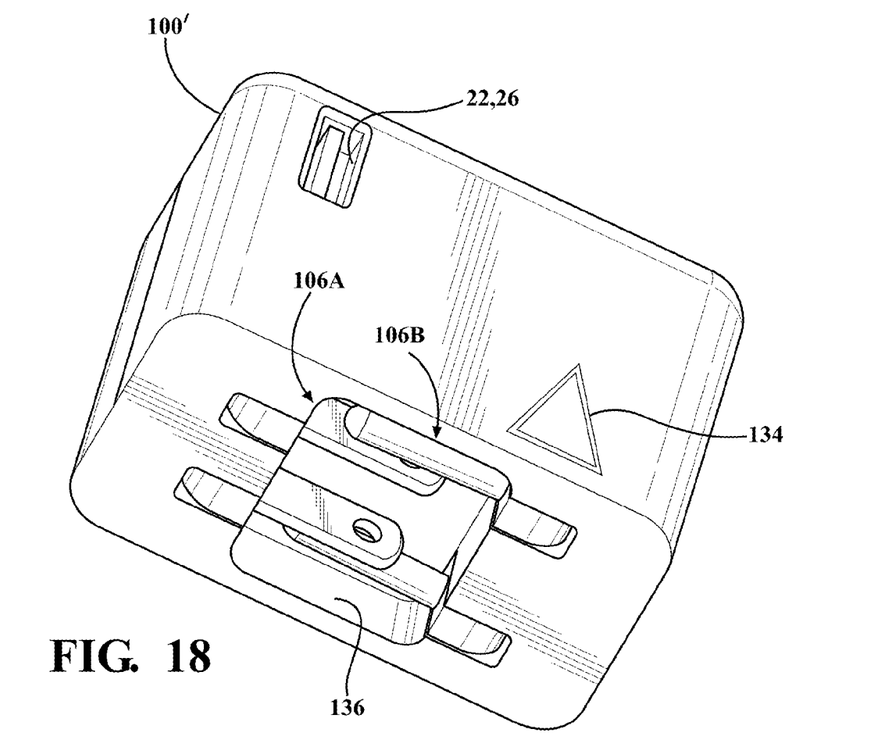

With reference to FIGS. 17 and 18, an alternative embodiment of the housing 100' is shown. The alternative housing 100' includes first and second USB ports 22, 26 (located on opposite sides thereof) and a logo 134. Separate pairs of prongs 106A, 106B are rotatably coupled to the housing 100' and electrically coupled to the power device 2.

INDUSTRIAL APPLICABILITY

In one aspect of the present invention, the power circuits 10, 24 are aimed at delivering a specified power output signal to an external device connected, e.g., through the USB port 22, 26. Most external devices do not require a pure direct current (DC) signal to operate correctly. Many external devices will work with a power signal that has a combination of alternating current (AC) and DC. The important consideration with a power output signal that has a combination of AC and DC is to not let the peak value exceed some limit. This limit is typically the value of a pure DC power output signal which is accomplished with this invention. For example: a USB device typically needs a 5V DC power signal. The limit is 5V so the peak value of the composite AC/DC signal cannot exceed 5V. To keep the power output signal from exceeding the limit, the control element will sense the peak value of the output power signal rather than the DC, or average, component. If there is no AC component, the peak value of the output power signal in the invention is equal to the DC component.

The power device 2 will supply a desired fixed voltage. For a given device, the desired voltage may be different. For example, for a cell phone, the desired voltage is typically 5 volts. The frequency of the output signals (from the microprocessor) is adjusted to always supply the target voltage. If a load requires more current, the frequency will increase so that the fixed output voltage stays in an acceptable range. For different device requiring different voltages, the power device 2 will output consecutively larger voltages and monitor the current. When a threshold current is being drawn from the power device 2, the microprocessor makes a threshold determination as to what voltage the output should be controlled, e.g., 5 volts, 9 volts, 12 volts or up to 19.6 volts for devices like notebooks and/or laptops.

In another aspect of the present invention, a battery and/or charging capacitor (supercap 98) may be used as a power storage device to power the microprocessor 86. Also, current as regulated from the feedback loop may be delivered to the microprocessor, avoiding the need for an initial power supply for the microprocessor. It is desirable to keep the microprocessor on through either a electricity source supply or charged by the supercap 98 and/or battery at all times such that the application of loads, i.e., devices, may be detected and their state of charge to begin a charging cycle. During normal charging operation, power is diverted from one of the charging outputs to provide power to charge the supercap 98 and/or battery. In the case when the power device 2 is either first utilized or has been inactive for a period of time, a bootstrap power supply may be temporarily activated to supply the initial power. Once the supercap 98 and/or battery has been charged, the bootstrap power supply may be turned off.

In another aspect of the present invention, the power device 2 eliminates vampire loads. The microprocessor 86 and feedback loop continually monitor the draw of current from the charging device. From the initiation of the charging cycle, a table is formed in the microprocessor 86 which analyzes the current draw. During the charging cycle the microprocessor 86 continues to monitor the current draw that is being consumed by the charging device through the current sensor resistor 78. The microprocessor 86 then analyzes that draw and reports when the draw begins to wane due to a fully charged device. The microprocessor 86 also stands on alert to sense when the current diminishes as the charging device approaches a full charge. From the initial outrush of current to the charging device through the entire charging cycle, the microprocessor 86 uses algorithms to determine when a charging device is fully or nearly fully charged (and when the current draw approaches zero). Then, the power device 2 shuts off power from its inrush supply and shuts down the charging and power draw from the inrush source. Also, the power device 2 can detect when a device is connected by sensing the current draw. At any time when there is no current draw, the power device shuts off, avoiding the ongoing electrical waste that normally exist when a charging device is still plugged into a wall outlet, but no phone is attached.

In the illustrated embodiment, the first power block or input circuit 28 is connected to the mains, i.e., the sourced electrical power 18, which consist of either 120 volts at a frequency of 60 Hertz (the North American Standard) or 220-240 volts at a frequency of 50 Hz (the European Standard). This power is supplied to a full wave bridge 30 which rectifies the AC into pulsating DC. This pulsating DC is converted into a continuous DC voltage through the use of the capacitors 36 and 38 and the inductor 32. The DC voltage supplied is approximately 180V DC in the case of the North American Standard or approximately 360V DC in the case of the European Standard.

The charging delivery system starts with the microprocessor 86 which delivers high frequency square waves via four ports. These signals are fed through isolator devices 88 and 90 to their respective FET driver sub assemblies 50A, 50B. In the case of sub assembly 50A a signal from the highside isolator 90 is supplied to an FET 62 via its gate. The purpose of the FET 62 is to increase the voltage swing of the square wave from logic levels (3.3V peak to peak) to a voltage level of about 15V peak to peak required to drive the power FET 42 the first driver circuit 50A also contains lowside driver FETs these FETs are supplied from the lowside isolator 88 which is injected into the first isolator's gate 56. This signal is amplified and inverted and then fed in to a subsequent FET 58. This signal is also amplified and then inverted to create a 15V peak to peak signal suitable for driving respective power FET 44.

The two power FETs 42, 44 are set up as a "Totem Pole" configuration. The top of the "Totem Pole" 42 is fed with the DC voltage supplied from the input circuit 28. The bottom FET 44 has its source attached to ground. This arrangement allows for the "Totem Pole" junction 52 to deliver the square waves supplied by circuit 50A with a peak to peak value of 180V in the case of the North American Standard or a peak to peak value of 360V in the case of the European Standard.

Circuits 50B, 40B function identically to circuits 50A, 40A as described above with the exception that the delivered square wave at 54 is 180 degrees out of phase with the square wave at 52.

These two square waves are fed into the frequency dependent reactive device which contains a full wave bridge that is supplied by signal 52 via capacitor 70A. The bottom side of the bridge is fed signal 54 via the capacitor 70B. Capacitors 70A and 70B are sized (capacitance value) to reduce the AC voltage output from the large peak to peak input (180V to 360V peak to peak) to a more manageable voltage in the neighborhood of 10 VAC. The rectified output of bridge 74 is fed into the output circuit 16. This output circuit consists of conductor 76 and capacitor 80 which converts the pulsating DC from bridge 74 into an unregulated DC voltage.

The balance of circuit 16 consists of a voltage sense assembly consisting of resistors 82 and 84 and a current sense resistor 78. The voltage sense assembly delivers a representation of the output voltage (that voltage which is delivered to the charging device) to one of the microprocessor's A/D convertors. The sense resistor 78 delivers a voltage that is a representation of the current that is being consumed by the charging device. This signal is supplied to another A/D convertor within the microprocessor. These signals enable the microprocessor to adjust the output voltage to a precise 5 VDC regardless of the current requirements of the charging device.

Figure 19:
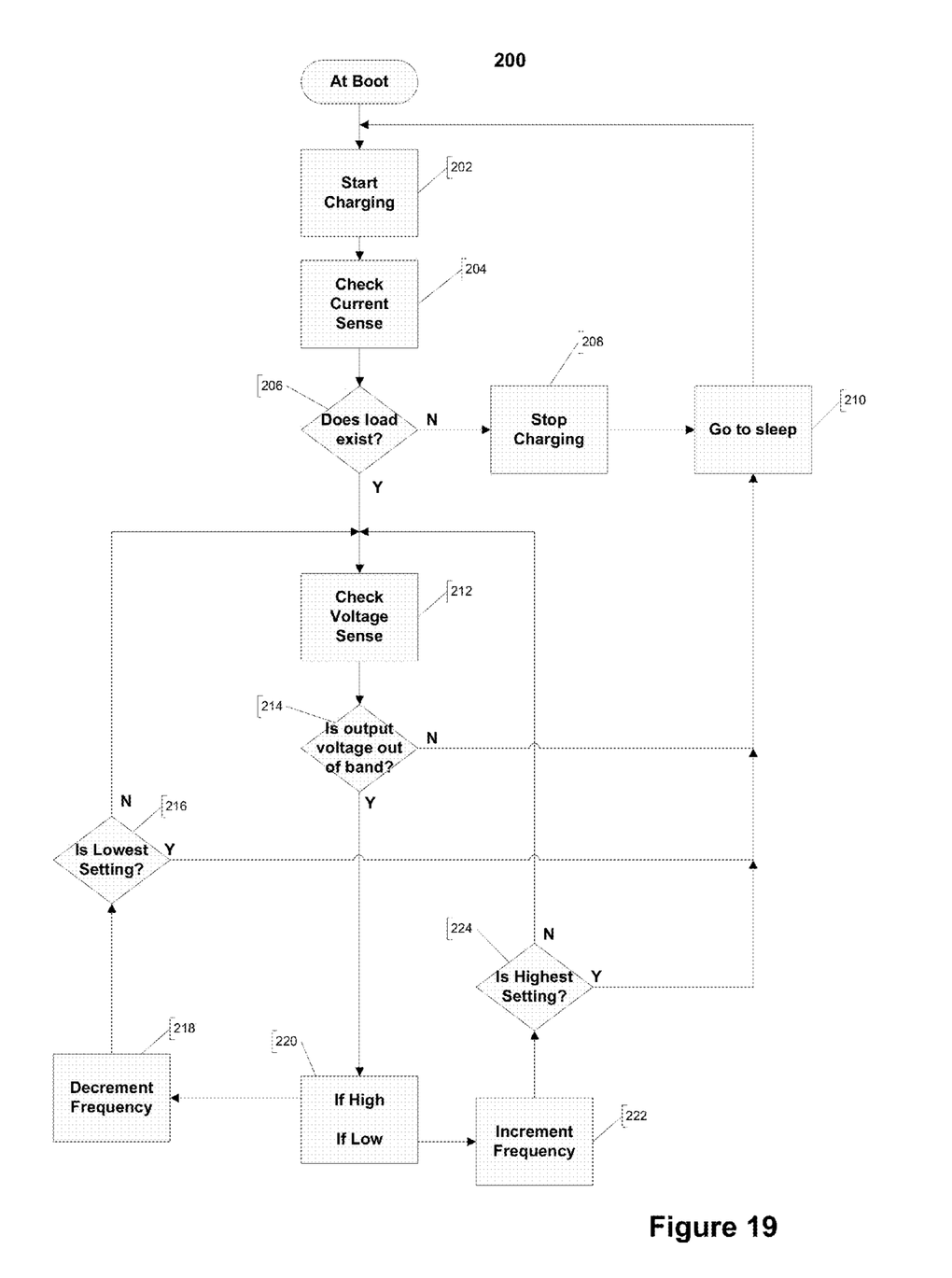
FIG. 19 is a flow diagram illustrating aperture of the power current of FIG. 1, according to an embodiment of the present invention.

With reference to FIG. 19, a boot time method 200 is shown. At boot time, the system initializes a charging routine at block 202. The microprocessor 86 then checks the current sense at block 204 to see if a load exists (block 206). If it does not, the microprocessor 88 turns off the charging routine (block 208) and enters a sleep period (block 210). After the sleep period the method 200 returns to the charging routine (block 202). The method 200 will stay in this loop as long as no load exists.

In the event that a load does exist (block 206) the method 200 checks the voltage sets (block 212). The system then compares what it reads with the acceptable in band voltage (block 214). If the voltage is not out of band the routine goes to sleep (block 210). If the voltage is out of band (block 214), the routine then checks if it is too high or too low (block 220).

If the voltage is too high the system decrements the output frequency (block 218) and then checks if the output frequency is at the lowest allowable setting (block 216). If yes, the routine goes to sleep (block 210). If no, the microprocessor once again checks the voltage sense (block 212). The microprocessor 86 will continue this loop until the output voltage has been reduced to the desired amount or it reaches the lowest allowable setting.

If the voltage is too low, the microprocessor 86 increments the output frequency (block 222) and then checks if the output frequency is at the highest allowable setting (block 224). If yes, the routine goes to sleep (block 210). If no, the method 200 once again checks the voltage sense (block 212). The method 200 will continue this loop until the output voltage has been increased to the desired amount or it reaches the highest allowable setting.

Many modifications and variations of the present invention are possible in light of the above teachings. The invention may be practiced otherwise than as specifically described within the scope of the appended claims.

What is claimed is:

1. An apparatus, comprising:
a power circuit including:
a switching device coupled to a source of electrical power, the switching device being adapted to receive a control signal and to produce an alternating current power signal, a frequency of the alternating current power signal being responsive to the control signal, the switching device including a first pair of transistors and a second pair of transistors, the first pair of transistors for driving a highside of the AC power signal, the second pair of transistors for driving a lowside of the AC power signal; and,
a frequency dependent reactive device electrically coupled to the switching device for receiving the alternating current power signal and producing an output power signal having a first voltage level, the frequency dependent reactive device including a plurality of capacitors, a first one of the capacitors being coupled to the first pair of switching devices for receiving the highside of the AC power signal, a second one of the capacitors being coupled to the second pair of transistors for receiving the lowside of the AC power signal, the capacitors being chosen to achieve a desired voltage of the output power signal relative to the frequency of the AC power signal, wherein the output power signal is a direct current power signal, the frequency dependent reactive device including a rectifier circuit coupled to the first and the second capacitors for transforming the AC power signal into the DC power signal.

2. An apparatus, as set forth in claim 1, further comprising:
a second power circuit including:
a second switching device coupled to the source of electrical power, the second switching device being adapted to receive a second control signal and to produce a second alternating current power signal, a frequency of the second alternating current power signal being responsive to the second control signal, and,
a second frequency dependent reactive device electrically coupled to the second switching device for receiving the second alternating current power signal and producing a second output power signal having a second voltage level, the second frequency dependent reactive device being chosen to achieve a desired second voltage of the second output power signal relative to the frequency of the second alternating current power signal, wherein the first and second voltage levels are different.

3. An apparatus, as set forth in claim 2, wherein the first voltage level is one of 5 volts, 9 volts, 12 volts or 19.6 volts, and the second voltage level is another one of 5 volts, 9 volts, 12 volts or 19.6 volts.

4. An apparatus, as set forth in claim 1, wherein the output power signal is an alternating current signal and the voltage level is a peak voltage.

5. An apparatus, as set forth in claim 1, further comprising a control element coupled to the switching device and the frequency dependent reactive device, the control element for sensing an actual voltage of the AC power signal and responsively modifying the control signal delivered to the switching device to achieve the desired reduced voltage of the DC power signal.

6. An apparatus, as set forth in claim 5, wherein the control signal has an associated frequency, the control element modifying to the frequency of the control signal in response to the actual voltage of the direct current power signal to achieve the desired voltage.

7. An apparatus, as set forth in claim 5, wherein the control signal is a frequency modulated signal having a period, the control element modifying the period in response to the actual voltage of the direct current power signal to achieve the desired voltage.

8. An apparatus, as set forth in claim 5, wherein the control element monitors the current being delivered and shuts off when there is no load or a battery of a load is fully or nearly fully charged.

9. An apparatus, as set forth in claim 1, the switching device including at least one pair of transistors in a totem pole configuration.

10. An apparatus, as set forth in claim 9, wherein an output of the switching device comprises the output current power signal.

11. An apparatus, as set forth in claim 10, wherein the transistors within the at least one pair of transistors operate 180 degrees out of phase.

12. An apparatus, as set forth in claim 1, each of the first and the second pairs of transistors being in a totem pole configuration, each of the pairs of transistors being driven by a separate control signal.

13. An apparatus, as set forth in claim 12, wherein an output of the first and second pairs of transistors comprise the output current power signal.

14. An apparatus, as set forth in claim 13, wherein the transistors within the first and second pairs of transistors operate 180 degrees out of phase.

15. An apparatus, as set forth in claim 14, wherein the output of the first and second pairs of transistors are 180 degrees out of phase.

16. An apparatus, as set forth in claim 1, the capacitors being chosen as a function of an impedance of the capacitors.

17. An apparatus, as set forth in claim 1, the switching device including a first driver circuit for regulating the first pair of transistors and a second driver circuit for regulating the second pair of transistors.

18. An apparatus, as set forth in claim 1, further comprising a universal serial bus port electrically coupled to the frequency dependent reactive device.

19. An apparatus, as set forth in claim 5, further comprising a lighting device coupled to the control element, the control element for turning on the lighting device when power is being supplied.

20. An apparatus, comprising:
a power circuit including:
a switching device being coupled to a source of electrical power and including a first pair of transistors and a second pair of transistors, the first pair of transistor being in a totem pole configuration, the switching device being adapted to receive a control signal and to produce an alternating current power signal, a frequency of the alternating current power signal being responsive to the control signal, the first pair of transistors for driving a highside of the AC power signal, the second pair of transistors for driving a lowside of the AC power signal;
a frequency dependent reactive device electrically coupled to the switching device for receiving the alternating current power signal and producing an output power signal having a first voltage level, the frequency dependent reactive device including a plurality of capacitors, a first one of the capacitors being coupled to the first pair of switching devices for receiving the highside of the AC power signal, a second one of the capacitors being coupled to the second pair of transistors for receiving the lowside of the AC power signal, the capacitors being chosen to achieve a desired voltage of the output power signal relative to the frequency of the alternating current power signal; and
a control element coupled to the switching device and the frequency dependent reactive device, the control element for sensing an actual voltage of the output power signal and responsively modifying the control signal delivered to the switching device to achieve the desired voltage of the output power signal, wherein the output power signal is a direct current power signal, the frequency dependent reactive device including a rectifier circuit coupled to the first and the second capacitors for transforming the AC power signal into the DC power signal.

21. An apparatus, as set forth in claim 18, wherein the output power signal is an alternating current signal and the voltage level is a peak voltage.

22. An apparatus, as set forth in claim 20, wherein the control signal has an associated frequency, the control element modifying to a frequency of the control signal in response to the actual voltage of the direct current power signal to achieve the desired voltage.

23. An apparatus, as set forth in claim 20, wherein the control signal is a frequency modulated signal having a period, the control element modifying the period in response to the actual voltage of the direct current power signal to achieve the desired voltage.

24. An apparatus, as set forth in claim 20, wherein an output of the switching device comprises the output current power signal.

25. An apparatus, as set forth in claim 20, wherein the transistors within the first pair of transistors operate 180 degrees out of phase.

26. An apparatus, as set forth in claim 20, the second pair of transistors being in a totem pole configuration.

27. An apparatus, as set forth in claim 26, wherein an output of the first and second pairs of transistors comprise the output current power signal.

28. An apparatus, as set forth in claim 26, wherein the output of the first and second pairs of transistors are 180 degrees out of phase.

29. An apparatus, as set forth in claim 20, the capacitors being chosen as a function of an impedance of the capacitors.

30. An apparatus, as set forth in claim 20, the switching device including a first driver circuit for regulating the first pair of transistors and a second driver circuit for regulating the second pair of transistors.

31. An apparatus, as set forth in claim 20, further comprising a universal serial bus port electrically coupled to the frequency dependent reactive device.

32. An apparatus, as set forth in claim 20, further comprising a lighting device coupled to the control element, the control element for turning on the lighting device when power is being supplied.

33. An apparatus, as set forth in claim 20, further comprising:

a second power circuit including:
a second switching device coupled to the source of electrical power, the second switching device being adapted to receive a second control signal and to produce a second alternating current power signal, a frequency of the second alternating current power signal being responsive to the second control signal, and,
a second frequency dependent reactive device electrically coupled to the second switching device for receiving the second alternating current power signal and producing a second output power signal having a second voltage level, the second frequency dependent reactive device being chosen to achieve a desired second voltage of the second output power signal relative to the frequency of the second alternating current power signal, wherein the first and second voltage levels are different.

34. An apparatus, as set forth in claim 33, wherein the first voltage level is one of 5 volts, 9 volts, 12 volts or 19.6 volts, and the second voltage level is another one of 5 volts, 9 volts, 12 volts or 19.6 volts.

35. An apparatus, as set forth in claim 20, wherein the control element monitors the current being delivered and shuts off when there is no load or a battery of a load is fully or nearly fully charged.

36. A power circuit for providing electrical power at a desired voltage level from an alternating current power source, comprising:
a first rectifying circuit electrically coupled to the alternative current power source for producing a first direct current power signal; and,
a voltage reduction circuit including:
a switching device being coupled to the first rectifying circuit and including first and second pairs of transistors, each pair of transistors arranged in a totem pole configuration, the first and second pairs of transistors for driving a high-side output and a low-side output, respectively, to produce an alternating current power signal, a frequency of the alternating current power signal being responsive to a control signal;
a control element coupled to the switching device for delivering the control signal to the switching device; and,
a frequency dependent reactive device electrically coupled to the first and second pairs of transistors for receiving the alternating current power signal and producing an output power signal having a first voltage level, the frequency dependent reactive device including a plurality of capacitors and a second rectifying circuit coupled to the capacitors, a first one of the capacitors being coupled to the first pair of switching devices for receiving the highside of the AC power signal, a second one of the capacitors being coupled to the second pair of transistors for receiving the lowside of the AC power signal, the capacitors being chosen to achieve the desired voltage of the output power signal relative to the frequency of the alternating current power signal, the control element configured to modify the control signal delivered to the switching element to regulate the switching device to achieve the desired voltage of the output power signal, wherein the output power signal is a direct current power signal.

37. An apparatus, as set forth in claim 36, wherein the control signal has an associated frequency, the control element modifying to a frequency of the control signal in response to the actual voltage of the direct current power signal to achieve the desired voltage.

38. An apparatus, as set forth in claim 36, wherein the control signal is a frequency modulated signal having a period, the control element modifying the period in response to the actual voltage of the direct current power signal to achieve the desired voltage.

39. An apparatus, as set forth in claim 36, further comprising a universal serial bus port electrically coupled to the frequency dependent reactive device.

40. An apparatus, as set forth in claim 36, further comprising a lighting device coupled to the control element, the control element for turning on the lighting device when power is being supplied.

41. An apparatus, as set forth in claim 36, further comprising:
a second voltage reduction circuit including:
a second switching device coupled to the source of electrical power, the second switching device being adapted to receive a second control signal and to produce a second alternating current power signal, a frequency of the second alternating current power signal being responsive to the second control signal, and,
a second frequency dependent reactive device electrically coupled to the second switching device for receiving the second alternating current power signal and producing a second output power signal having a second voltage level, the second frequency dependent reactive device being chosen to achieve a desired second voltage of the second output power signal relative to the frequency of the second alternating current power signal, wherein the first and second voltage levels are different.

42. An apparatus, as set forth in claim 41, wherein the first voltage level is one of 5 volts, 9 volts, 12 volts or 19.6 volts, and the second voltage level is another one of 5 volts, 9 volts, 12 volts or 19.6 volts.

43. An apparatus, as set forth in claim 36, wherein the control element monitors the current being delivered and shuts off when there is no load or a battery of a load is fully or nearly fully charged.

* * * * *

UNITED STATES PATENT AND TRADEMARK OFFICE
CERTIFICATE OF CORRECTION

Page 1 of 1

PATENT NO. : 9,520,799 B2
APPLICATION NO. : 13/588262
DATED : December 13, 2016
INVENTOR(S) : W. J. Jim Weaver, Jr. et al.

It is certified that error appears in the above-identified patent and that said Letters Patent is hereby corrected as shown below:

In the Claims

Column 16, Line 25: Please delete "as set forth in claim 18," and replace with -- as set forth in claim 20, --

Signed and Sealed this
Ninth Day of May, 2017

Michelle K. Lee
*Director of the United States Patent and Trademark Office*